United States Patent
Takashima et al.

(10) Patent No.: US 9,977,402 B2
(45) Date of Patent: May 22, 2018

(54) OPTICAL INFORMATION RECORDING/REPRODUCING APPARATUS, OPTICAL INFORMATION RECORDING/REPRODUCING METHOD

(71) Applicants: Yuzuru Takashima, Tucson, AZ (US); Kenichi Shimada, Kanagawa (JP)

(72) Inventors: Yuzuru Takashima, Tucson, AZ (US); Kenichi Shimada, Kanagawa (JP)

(73) Assignees: THE ARIZONA BOARD OF REGENTS ON BEHALF OF THE UNIVERSITY OF ARIZONA, Tucson, AZ (US); HITACHI, LTD., Kanagawa (JP)

(*) Notice: Subject to any disclaimer, the term of this patent is extended or adjusted under 35 U.S.C. 154(b) by 0 days. days.

(21) Appl. No.: 15/316,411

(22) PCT Filed: Jun. 7, 2014

(86) PCT No.: PCT/US2014/041438
§ 371 (c)(1),
(2) Date: Jan. 18, 2017

(87) PCT Pub. No.: WO2015/187185
PCT Pub. Date: Dec. 10, 2015

(65) Prior Publication Data
US 2017/0176931 A1 Jun. 22, 2017

(51) Int. Cl.
*G11B 7/0065* (2006.01)
*G03H 1/14* (2006.01)
(Continued)

(52) U.S. Cl.
CPC ........... *G03H 1/14* (2013.01); *G02B 26/0816* (2013.01); *G03H 1/0486* (2013.01); *G03H 1/2286* (2013.01); *G11B 7/0065* (2013.01); *G11B 7/126* (2013.01); *G11B 7/1362* (2013.01); *G03H 2001/0489* (2013.01); *G03H 2222/42* (2013.01); *G03H 2223/24* (2013.01); *G03H 2226/02* (2013.01)

(58) Field of Classification Search
None
See application file for complete search history.

(56) References Cited

U.S. PATENT DOCUMENTS 3,073,215 A  1/1963  Fischer
2009/0129234 A1  5/2009  Uno

OTHER PUBLICATIONS

Muroi, T. et al. "Optical compensation of distorted data image caused by interference fringe distortion in holographic data storage". Applied Optics, vol. 48, Issue 19, pp. 3681-3690. Jun. 22, 2009.

(Continued)

*Primary Examiner* — Brian Butcher
(74) *Attorney, Agent, or Firm* — Stuart H. Mayer; Mayer & Williams PC

(57) ABSTRACT

An optical information recording/reproducing apparatus and method thereof which compensate for the effect of mechanical instability on holographic data storage. A time dependent deviation profile of an optical beam during recording is determined. The time dependent deviation profile is related to a phase profile to be applied to a reference beam during recording or reproduction of a hologram, and the related phase profile is applied to the reference beam during recording or reproduction of the hologram.

15 Claims, 11 Drawing Sheets

(51) Int. Cl.
    *G02B 26/08* (2006.01)
    *G03H 1/22* (2006.01)
    *G03H 1/04* (2006.01)
    *G11B 7/126* (2012.01)
    *G11B 7/1362* (2012.01)

(56) References Cited

OTHER PUBLICATIONS

Zhang, R et al. "Membrane Structure Characterization Using Variable-Period X-Ray Standing 1-21 Waves". Biophysical Journal, vol. 74, Issue 4, pp. 1924-1936. Apr. 1998.

OPTICAL INFORMATION RECORDING/REPRODUCING APPARATUS, OPTICAL INFORMATION RECORDING/REPRODUCING METHOD

BACKGROUND OF THE INVENTION

Field of the Invention

The present invention is related to an apparatus and method which record and/or reproduce information on an optical information recording medium by using holography.

Description of the Related Art

Through a BLU-RAY DISC™ specification using a blue-violet semiconductor laser, at present, commercialization of optical disk having recording density of about 100 GB is presently performed. From now on, large capacity greater than 500 GB is expected from optical disk recording. However, for realizing the above-described ultra-high density by using an optical disk, a high-density technology is needed through another method which is different from a high-density technology using the conventional short wavelength and high numerical aperture of objective lens.

Holographic Data Storage System (HDSS) has been considered as one of promising candidates for future Optical Data Storage (ODS) systems. HDSS can record an encoded data page with around a couple million pixels with a single light pulse. Furthermore, hundreds of data pages can be multiplexed at the same location in the media. HDSS has a high possibility of becoming a Post BD system.

However, tolerances of HDSS to physical perturbation such as mechanical instability needs to be stringent in return for the associated high density recording. Especially, the tolerances of HDSS using angularly multiplexed recording will be stringent because of the narrow Bragg selectivity associated with the utilized off-axis optical configuration.

U.S. Pat. Appl. No. 20090129234 (the entire contents of which are incorporated herein by reference) describes a hologram recording device which illuminates with a recording beam (S) a hologram recording medium (B), and which illuminates with a reference beam (R) a region illuminated with the recording beam (p) while variably controlling the incident angle regarding the hologram recording medium (B).

Compensation techniques for reducing the degradation of recording/reading of the hologram have been described. For example, Muroi et al., published "Optical compensation of distorted data image caused by interference fringe distortion in holographic data storage," in Appl. Opt. 48(19), 3681-3690 (2011), the entire contents of this publication are incorporated herein by reference. In this publication, an optical compensation method using adaptive optics for the distortion of interference fringes in the holographic medium. A genetic algorithm is employed to control the adaptive optics with a deformable mirror.

SUMMARY OF THE INVENTION

In one embodiment of the present invention, there is provided an optical information processing apparatus for recording information in a holographic medium. The apparatus comprises a laser source which generates at least one optical beam including a reference beam and a signal beam, a beam control device which steers an incident angle of the reference beam with respect to the holographic medium to write data in the holographic medium based on interference of the reference beam and the signal beam in the holographic medium, a deviation profiler which obtains a time dependent deviation profile of the optical beam for one page of data recorded in the holographic medium at a nominally fixed angle of the incident angle of the reference beam, a processor programmed to relate the time dependent deviation profile to at least one of a phase profile and an amplitude profile to be applied to the reference beam, and an adaptive optical element which applies the at least one of the phase profile and the amplitude profile to the reference beam to compensate for time dependent deviations of the optical beam.

In one embodiment of the present invention, there is provided an optical information processing apparatus for reading information in a holographic medium. The apparatus comprises a laser source which generates a reference beam, a beam control device which steers an incident angle of the reference beam with respect to the holographic medium to read data in the holographic medium, a processor programmed to relate a time dependent deviation profile, associated with an optical beam which recorded said data in the holographic medium, to at least one of a phase profile and an amplitude profile, an adaptive optical element which applies the at least one of the phase profile and the amplitude profile to the reference beam to compensate for time dependent deviations of the optical beam which occurred in the recording of said information, and an optical reader which reads the data in the holographic medium.

In one embodiment of the present invention, there is provided a method of processing information in a holographic medium. The method comprises determining a time dependent deviation profile of an optical beam which recorded (or is recording) one page of data in the holographic medium at a nominally fixed angle of the optical beam, and relating the deviation profile to at least one of a phase profile and an amplitude profile to be applied while processing the information in the holographic medium.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

The described techniques in the prior art control adaptive optics only after a hologram image is reproduced at least once because these techniques use information on the brightness of the reproduced image on a camera (for example) as an evaluation parameter in a genetic algorithm. These techniques make for wasteful light exposure to the holographic medium during reproduction, which leads to a reduction of reproduction speed.

Moreover, the inventors of this application have discovered that a galvo mirror in conventional HDSS is a source of mechanical vibration which degrades the recording/reading of the hologram medium.

This problem and other problems can be resolved by the invention detailed below which provides one or more reliable optical information recording/reproducing apparatuses.

(First Embodiment)

Figure 1:
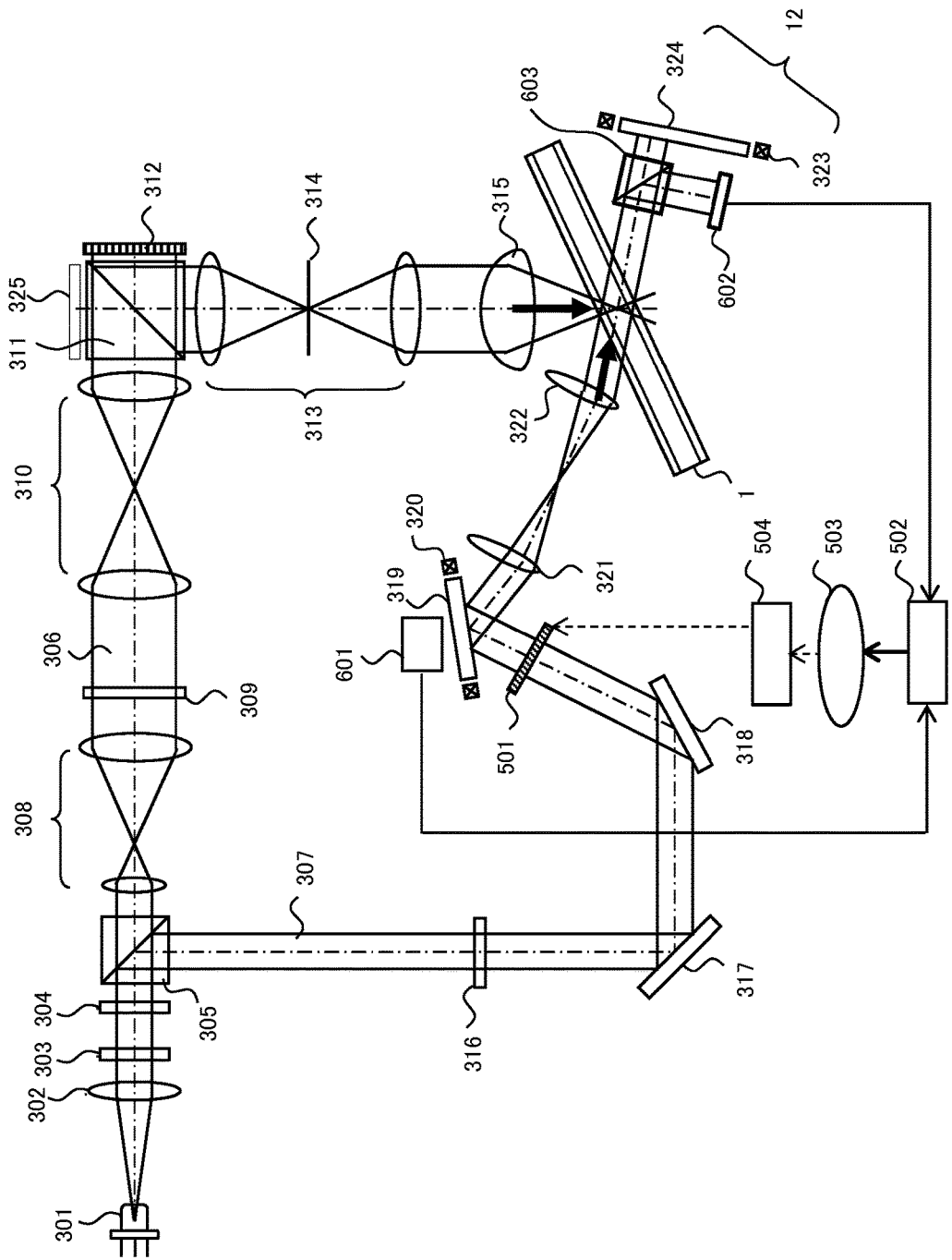
FIG. 1 is a schematic illustrating a recording principle of an example of a basic optical system in the optical information recording/reproducing apparatus.

A first embodiment of the invention will be described with reference to FIG. 1. FIG. 1 shows a recording principle of an example of a basic optical system in the optical information recording/reproducing apparatus. A light beam emitted from a variable wavelength laser 301 of an external resonator type (as an example of a light source) is collimated by a collimating lens 302 and directed to a shutter 303. When the shutter 303 is opened, the light beam is passed through the shutter 303 and through an optical element 304 formed, for example, as a ½ wavelength plate. The optical element 304 provides polarization direction control so that a beam ratio of P and S polarization becomes a desired value, and then the beam is directed into the PBS (Polarization Beam Splitter) prism 305.

One light beam passed through the PBS prism 305 works as a signal beam 306. The light beam is enlarged in diameter by a beam expander 308, is passed through a phase mask 309, a relay lens 310 and a PBS prism 311, and then is directed to a spatial light modulator 312.

A signal beam having information added by the spatial light modulator 312 is reflected by the PBS prism 311, and then propagated to a relay lens 313 and a spatial filter 314. Thereafter, the signal beam is focused on the optical information recording medium 1 by an objective lens 315.

Meanwhile, another light beam reflected by the PBS prism 305 acts as a reference beam 307. Reference beam 307 is set by a polarization direction conversion element 316 to have a predetermined polarization direction according to the recording or reproducing mode, is passed through a mirror 317 and a mirror 318, and is passed through adaptive optics 501 (such as for example a programmable liquid crystal device). Adaptive optics 501 can be placed at any position along the reference beam's optical path, but preferably is positioned prior to galvanometer mirror 319, to avoid displacement of the beam at the location of the adaptive optics. Then the reference beam 307 is directed to a galvanometer mirror 319. Since the galvanometer mirror 319 can be adjusted in angle by an actuator 320, the incident angle of the reference beam passed through a lens 321 and a lens 322 with respect to the optical information recording medium 1 can be set at a desired angle. In this connection, in order to set the incident angle of the reference beam, an element for converting the wave front of the reference beam may be employed in place of the galvanometer mirror.

For example, other mechanical actuator such as a bimorph type actuator can be used instead of the galvano mirror actuator. This type of mechanical actuator suffers from the similar problem, transient vibrations upon actuating/stopping motions. Non-mechanical beam steering apparatus such as liquid crystal (LC) beam steering device, and electro-optics (EO) beam deflector, acoustic optics (AO) beam deflector are available. Micro-electro-mechanical-system (MEMS) based beam steering device, for example, Digital micro mirror device from Texas Instruments, Grating Light Bulb from Silicon Light Machines, Adaptive optics device from Alpao, and Boston instruments are available. However, none of those non-mechanical beam deflector and MEMS-based ones have comparable performance to the mechanical type actuators in terms of wide beam deflection angles over +−20 degrees, number of resolvable spots, and optical efficiency. Furthermore, these systems can also be susceptible to transient vibrations arising from other various sources. Therefore, the transition vibration problem is crucial for current high density and high data transfer rate holographic data storage system employing angular multiplexing.

When the signal beam and the reference beam are directed onto the optical information recording medium 1 to be overlapped with each other in this way, an interference fringe pattern is formed within the recording medium, and a pattern is written in the recording medium where local regions of constructive interference cause a phase change in the recording medium, thereby recording the information. Further, since the incident angle of the reference beam directed to the optical information recording medium 1 can be changed by the galvanometer mirror 319, angle multiplexing recording can be achieved.

With respect to holograms recorded in the same area with varied reference beam angles, a hologram corresponding to each reference beam angle will be referred to as a page, and a set of pages angle-multiplexed in the same area will be referred to as a book, hereinafter.

In the optical system, a physical condition such as angle and/or position of optical components and/or an optical beam is detected by a deviation profiler, for example a sensor utilized during recording of the hologram. The deviation profiler obtains/determines a time dependent deviation profile of an optical beam which recorded (or is recording) one page of data in the holographic medium at a nominally fixed angle of the optical beam. "Nominally" as used herein means that which is expected without incidental, accidental, or inadvertent deviations.

For example, sensor 601 monitors an angle of the galvanometer mirror 319, or a sensor 602 detects an incident angle of reference beam 307 with respect to the medium 1 through PBS 603. The sensor 601 in one embodiment may be inside the galvanometer. Both sensors 601 and 602 are not necessarily required to detect a physical condition in the system, either one is enough for the system. Information on an angular deviation profile of time dependent deviation of the angle detected by sensor 601 or 602 is sent to processor 502. In other words, sensors 601 and 602 or other deviation measurement devices measure the deviation of the optical beam from its nominal position when writing one page of data to the medium 1 under conditions where the incident angle of reference beam 307 is intended to be fixed. Vibrations of the galvanometer mirror 319 or vibrations on other of the optical components cause the optical beam to deviate from its nominal position. As described in more detail below, processor 502 relates the information on the deviation profile to information on a control signal for the adaptive optics 501. The information related to a control signal is stored in a memory 503. The memory 503 may be the medium 1 and the information may be able to be stored optically in the medium.

Figure 2:
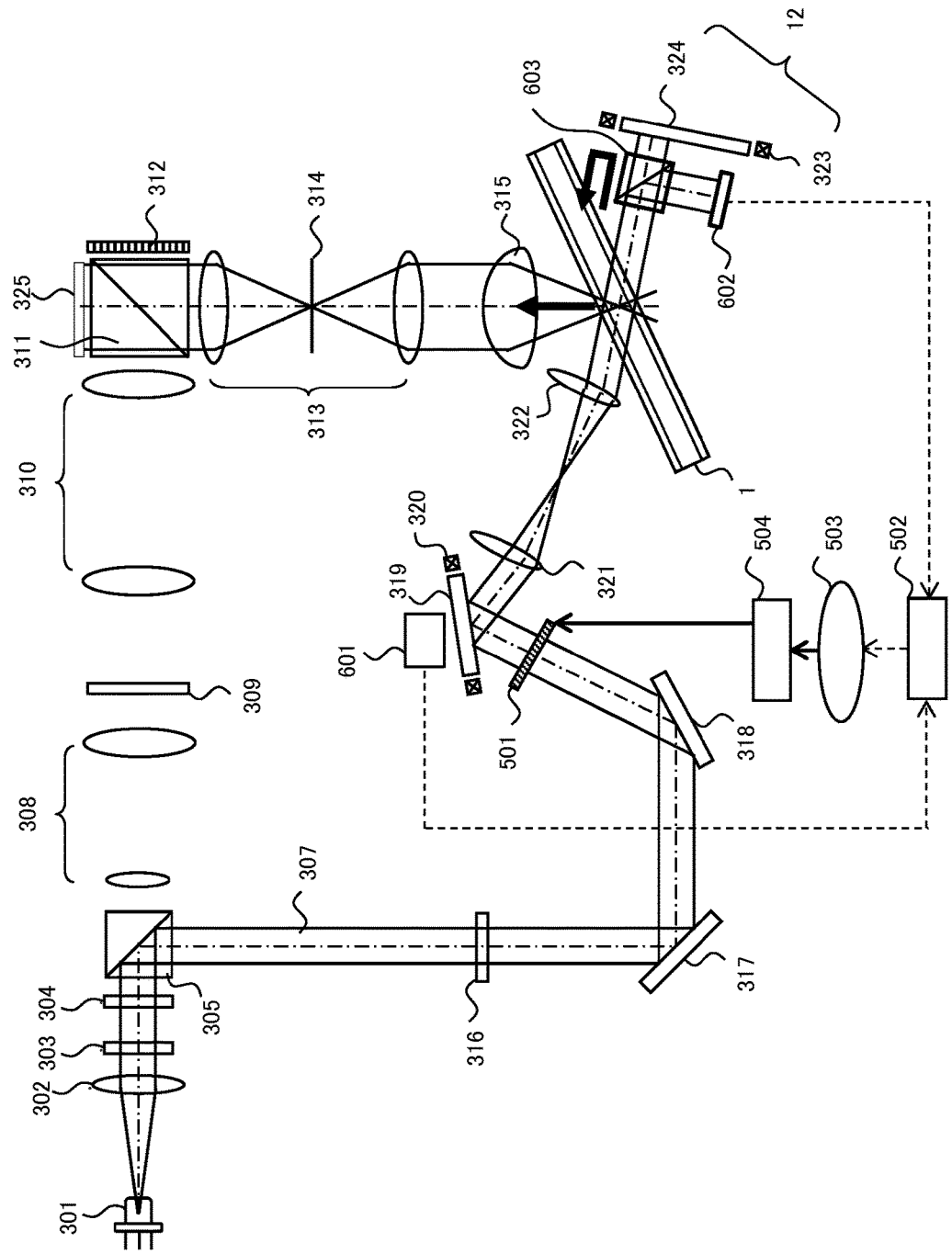
FIG. 2 is a schematic illustrating a reproduction principle of an example of a basic optical system in the optical information recording/reproducing apparatus.

FIG. 2 shows a reproduction principle of an example of a basic optical system in the optical information recording/reproducing apparatus of this invention. When it is desired to reproduce recorded information, reference beam 307 is directed through adaptive optics 501 to the optical information recording medium 1. As before, adaptive optics 501 can be placed at any position along the reference beam's optical path, but preferably is positioned prior to galvanometer mirror 319. Light from the reference beam 307 passes through the optical information recording medium 1 and is reflected by galvanometer mirror 324, which is angle-adjustable by an actuator 323, thus generating a reproduction reference beam (depicted by the arrow extending from medium 1 to objective lens 315).

Reproduction light reproduced based on the reproduction reference beam propagates to the objective lens 315, the relay lens 313, and then the spatial filter 314. Thereafter, the reproduction light is passed through the PBS prism 311, and then directed to an optical detector 325 to reproduce the recorded signal. Though an image sensor such as a CMOS or a CCD can be used as the optical detector 325, the optical detector may be any element as long as the element can reproduce the page data.

When a recorded hologram is reproduced from medium 1, the stored information related to the control signal for the adaptive optics 501 in the memory 503 is sent to a controller 504 for the adaptive optics 501. According to the control signal, the controller 504 controls the adaptive optics 501 so that the adaptive optics 501 applies at least either a phase or amplitude profile to the reference beam 307.

Figure 3:
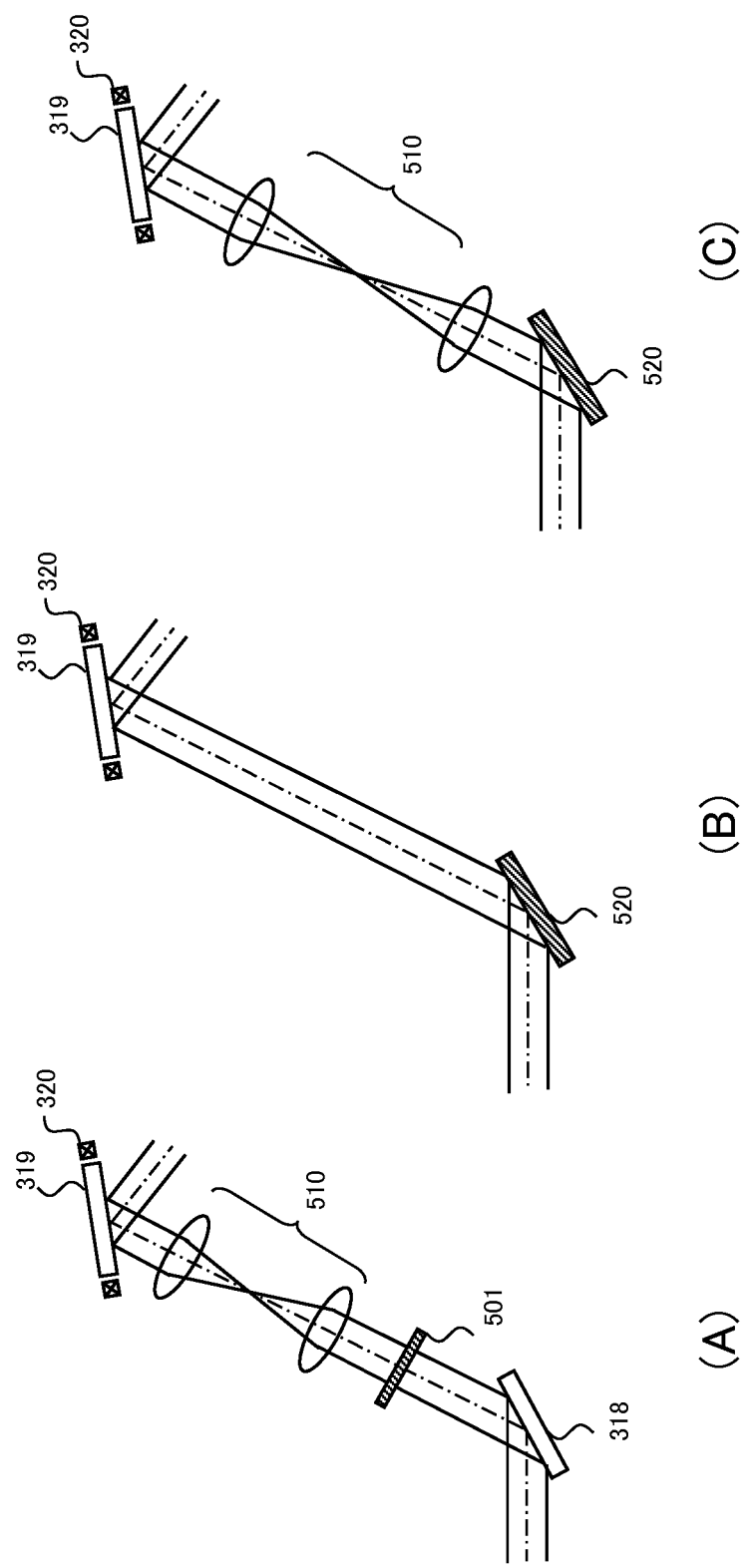
FIG. 3A is a schematic diagram of optical architecture around an adaptive optics with a relay system.
FIG. 3B is a schematic diagram of a reflection type adaptive optics.
FIG. 3C is a schematic diagram of a reflection type adaptive optics (C) reflection type of an adaptive optics with a relay system.

The example of optical architecture of the optical system in the optical information recording/reproducing apparatus is not limited to FIG. 1 or 2. For example, a phase profile applied by the adaptive optics 501 may be projected to the medium 1 through relay system 510 as shown in FIG. 3A. As shown in FIG. 3B or 3C, a reflection type of adaptive optics (such as deformable mirror 520) may be used instead of mirror 318 or with adaptive optics 501.

The present invention utilizes a method of optical compensation for the mechanical instabilities occurring during the recording of a hologram. The present inventors have discovered that the effect of the mechanical instability is related to optical parameters such as the amplitude and phase of reference beam as follows.

Figure 4:
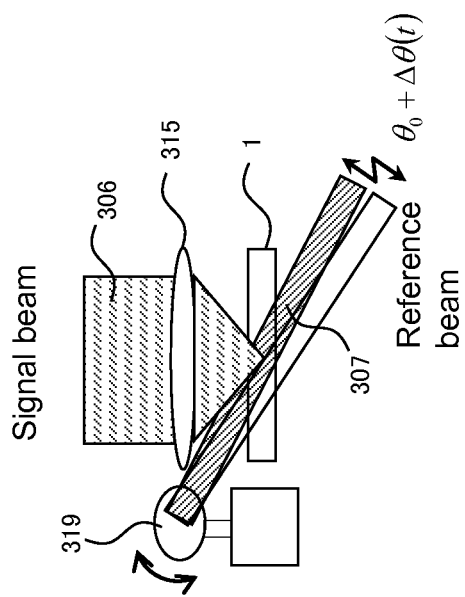
FIG. 4 is a schematic diagram of oscillation of the reference beam angle due to the instability of the mirror angle of galvano meter.

The mechanical instability of the mirror angle of a galvanometer induces oscillation of reference beam angle $\Delta\theta(t)$ (see FIG. 4). How the oscillation of reference beam angle $\Delta\theta(t)$ affects reproduced beam is explained below. When a reference beam $R_w$ is considered as a plane wave having a DC component of incident angle with respect to a holographic medium which is $\theta_0$, the complex amplitude of reference beam in the medium can be expressed by $$R_w = A \cdot \exp\left[j\frac{2\pi}{\lambda}\left\{\sin(\theta_0 + \Delta\theta(t)) \cdot x + \sqrt{n^2 - \sin^2(\theta_0 + \Delta\theta(t))} \cdot z\right\}\right], \quad (1)$$

where n is a index of refraction in the medium, $\lambda$ is a wavelength, A is a constant of complex value, the z-axis is chosen perpendicular to the surface of the holographic medium, the x-axis parallel to the medium. The x-z plane is the plane of incidence of reference beam. While other parameter characterizations are possible in this invention (e.g., depending on the degree of approximation used), under the condition that $\Delta\theta(t)$ is a small oscillation and of the order of sub-degree, one can consider $\cos\Delta\theta=1$, $\sin\Delta\theta=\Delta\theta$ and neglect $\Delta\theta^2$ or higher terms. As a result, Eq. (1) can be rewritten by $$R_w = A \cdot \exp\left\{j\frac{2\pi}{\lambda}\left(\sin\theta_0 \cdot x + \sqrt{n^2 - \sin^2\theta_0} \cdot z\right)\right\} \cdot \exp\left\{j\frac{2\pi}{\lambda}\cos\theta_0(x - z \cdot \tan\theta_0') \cdot \Delta\theta\right\}, \quad (2)$$

where $\theta_0'$ is the internal angle of $\theta_0$ inside the recording medium 1.

The first exponential term in Eq. (2) denotes a plane wave without oscillation whose incident angle is $\theta_0$. The hologram recorded utilizing the above reference beam is a time average hologram over recording exposure time $t_r$. The inventors have recognized the following parameter $f_{wf}$ as a weighting factor which indicates an oscillation effect due to an inadvertent oscillation of reference beam angle during the recording or writing of the page data to the recording medium 1.

$$f_{wf} = \frac{1}{t_r}\int_0^{t_r} \exp\left\{j\frac{2\pi}{\lambda}\cos\theta_0(x - z \cdot \tan\theta_0') \cdot \Delta\theta\right\}dt, \quad (3)$$

When there is no oscillation in incident angle ($\Delta\theta=0$), the weighting factor becomes "1" as evidenced by the integral in Eq. (3). The oscillation effect can be optically interpreted as if an optical filter whose transmittance is $f_{wf}$ is simply applied to the original reference beam. For example, when $\Delta\theta$ is a simple harmonic oscillation, $$\Delta\theta(t) = \frac{a_w}{2} \cdot \cos\frac{2\pi}{t_r}t, \quad (4)$$

the weighting factor $f_{wf}$ can be solved analytically and the solution is the 0th order Bessel function of the first kind, $$f_{wf} = J_0\left(\frac{\pi}{\lambda}\cos\theta_0(x - z \cdot \tan\theta_0') \cdot a_w\right), \quad (5)$$

Thus, the oscillation effect of reference beam angle on reproduced beam due to the mechanical instability of galvo mirror can be formulated.

Figure 10:
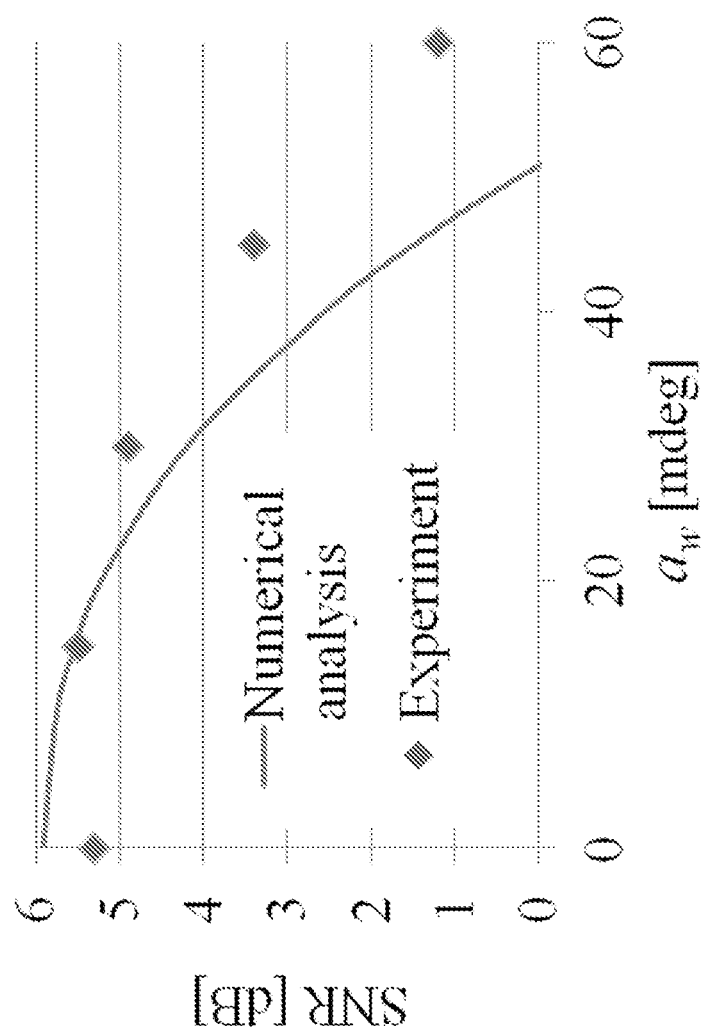
FIG. 10 is a graph depicting the signal to noise ratio (SNR) with $a_w$ on the horizontal axis of data from a reproduced hologram.

FIG. 10 shows a graph of the signal to noise ratio (SNR) with $a_w$ (the vibrational deviation) on the horizontal axis of data from a reproduced hologram. The solid line and the points in the graph show respective results for numerical analysis and measured SNR. SNR is an indicator of the quality of reproduced hologram. Although the curve calculated by numerical analysis showed a little higher sensitivity, the deterioration behavior caused by the oscillation was in good agreement with experimental results.

Of note, the oscillation profile for this optical model (or for this invention) is not limited to a simple harmonic oscillation. By calculating the weighting factor $f_{wf}$ in Eq. (3) analytically or numerically, arbitrary oscillation profiles of the reference beam angle can be incorporated into the model and used according to the invention. Indeed, with the processor described above and the programming components detailed below, complex oscillation profiles including but not limited to underdamped, overdamped, or forced oscillations or oscillations composed of multiple frequencies can be used according to the invention.

In one embodiment of this invention, if the complex amplitude of reference beam can be modulated in advance by an optical filter whose transmittance has an opposite characteristic of $f_{wf}$, for example opposite in phase and amplitude, the oscillation effect can be compensated for during either reading or writing of the hologram data.

For the sake of simplicity to illustrate this principle and without restriction on this invention, assume that an incident angle of reference beam oscillates in a simple harmonic oscillation. The oscillation effect on a reproduced beam can be compensated by applying an optical filter whose transmittance is $T_w$ to reference beam during recording state, $$T_w = \frac{1}{f_{wf}} = \frac{1}{J_0\left(\frac{\pi}{\lambda}\cos\theta_0(x - z\cdot\tan\theta_0')\cdot a_w\right)}, \quad (6)$$

Similarly, the oscillation effect can be compensated by modulating the complex amplitude of reference beam during a readout state. By applying during reading an optical filter whose transmittance $T_r$ has an opposite characteristic, e.g., a complex conjugate of $f_{wf}$, to a reference beam during the reproducing operation, the oscillation effect on reproduced beam can be compensated.

$$T_r = \left(\frac{1}{f_{wf}}\right)^* = \frac{1}{J_0\left(\frac{\pi}{\lambda}\cos\theta_0(x - z\cdot\tan\theta_0')\cdot a_w\right)}, \quad (7)$$

In one approximation suitable for the present invention, a processor controlling the adaptive optical element (e.g., adaptive optics 501) can be programmed to relate the time dependent deviation profile to at least one of the phase profile and the amplitude profile so that the adaptive optical element follows the function $f(x)$, $$f(x) = \frac{1}{\int_0^{t_r} \exp\left\{j\frac{2\pi}{\lambda}\cos\theta_0\cdot\Delta\theta(t)\cdot x\right\}dt}$$

where $\theta_0$ is a designed incident angle of the reference beam with respect to the holographic medium, $t_r$ is the recording exposure time, $\Delta\theta(t)$ is a time dependent deviation of the incident angle of the reference beam from the designed incident angle $\theta_0$, $\lambda$ is a wavelength of the reference beam, and x indicates a deviated position of the reference beam on an axis including the incident angle $\theta_0$.

Quite surprisingly, the seemingly random nature of the mechanical instability of galvo mirror can be compensated for with an optical filter whose phase and amplitude deviation from the reference beam axis do not have to respond in a time frame of the vibrational frequencies.

Figure 5:
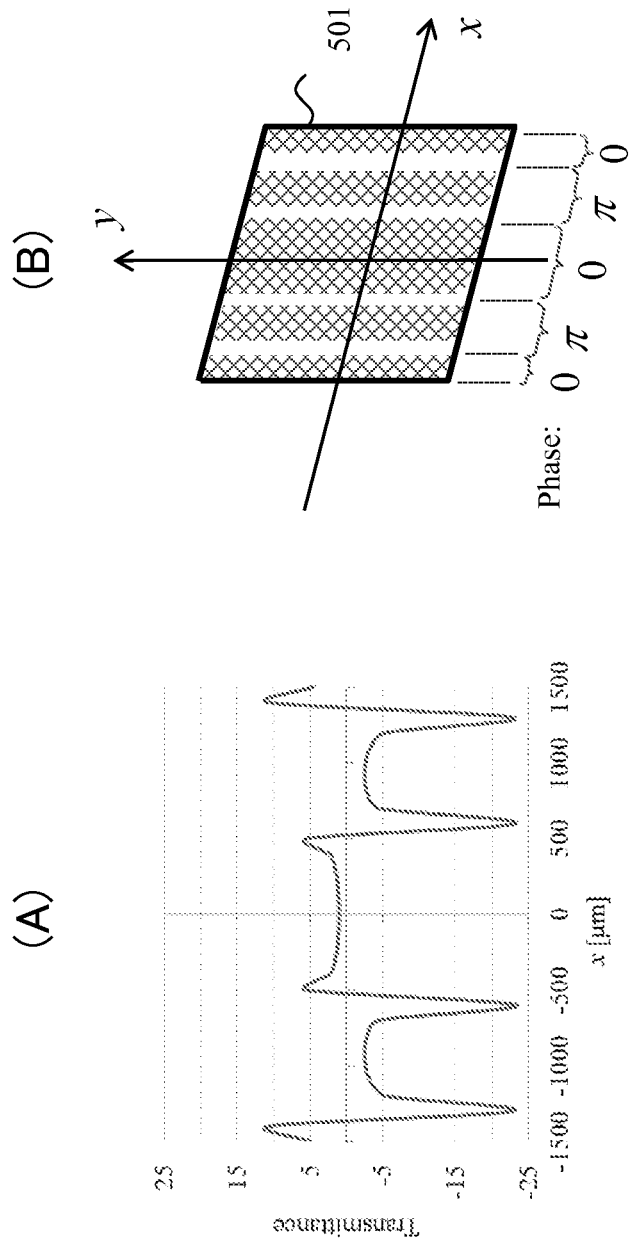
FIG. 5A is a schematic illustrating an amplitude and phase profile to compensate for mechanical vibration effect $a_w=40$ millidegrees, when $\theta_0$ is 40 degrees and $\lambda$ is 405 nm.
FIG. 5B is a schematic illustrating B) a phase profile to be applied to a reference beam through an adaptive optics.

One example of a suitable transmittance profile of the optical filter is shown in FIG. 5A. The profile is calculated by using Eq. (7) at $a_w$=40 millidegrees, when $\theta_0$ is 40 degrees and $\lambda$ is 405 nm. The horizontal axes in the FIG. 5 graphs denote the location corresponded to that in the medium in the x-axis. The vertical axes denote a suitable transmittance at the location. By modulating amplitude and phase of reference beam appropriately as described in FIG. 5A, the mechanical oscillation effect can be optically compensated. For example, the adaptive optics 501 applies at least either a phase or amplitude profile to reference beam 307 accordingly as described in FIG. 5B. In FIG. 5A, the region where the magnitude of the transmittance exceeds 1 means higher incident power compared to the power of reference beam for reproduction for ideal recording case where there exists no vibration. To readout holograms recorded with oscillation of beams, some part of the hologram has to be illuminated by readout reference beam with higher power.

In one embodiment of the invention, the incident power of the reading beam can be increased by increasing the output of light source during the compensation. Alternatively, two adaptive optics devices are effectively incorporated along with increasing the power. Two adaptive optics device are combined so that power distribution in x direction in FIG. 5B is controlled. A first adaptive optics device in illuminated by a plane wave, and it locally changes beam deflection angle. The deflected beam propagates to the second adaptive optics device. At the second adaptive optics device, local power density is modulated to satisfy the magnitude of the inverse of the profile of Eqn (3), or 1/|fwf|. The second adaptive optics add "pi" ($\pi$) phase term for the area as depicted in FIG. 5B, as well as it re-collimate the modulated beam by the first adaptive optics. Since in this embodiment there is no absorptive device incorporated, the two-component adaptive optics system is effective to reduce the power required to compensate for the vibration effect.

Figure 6:
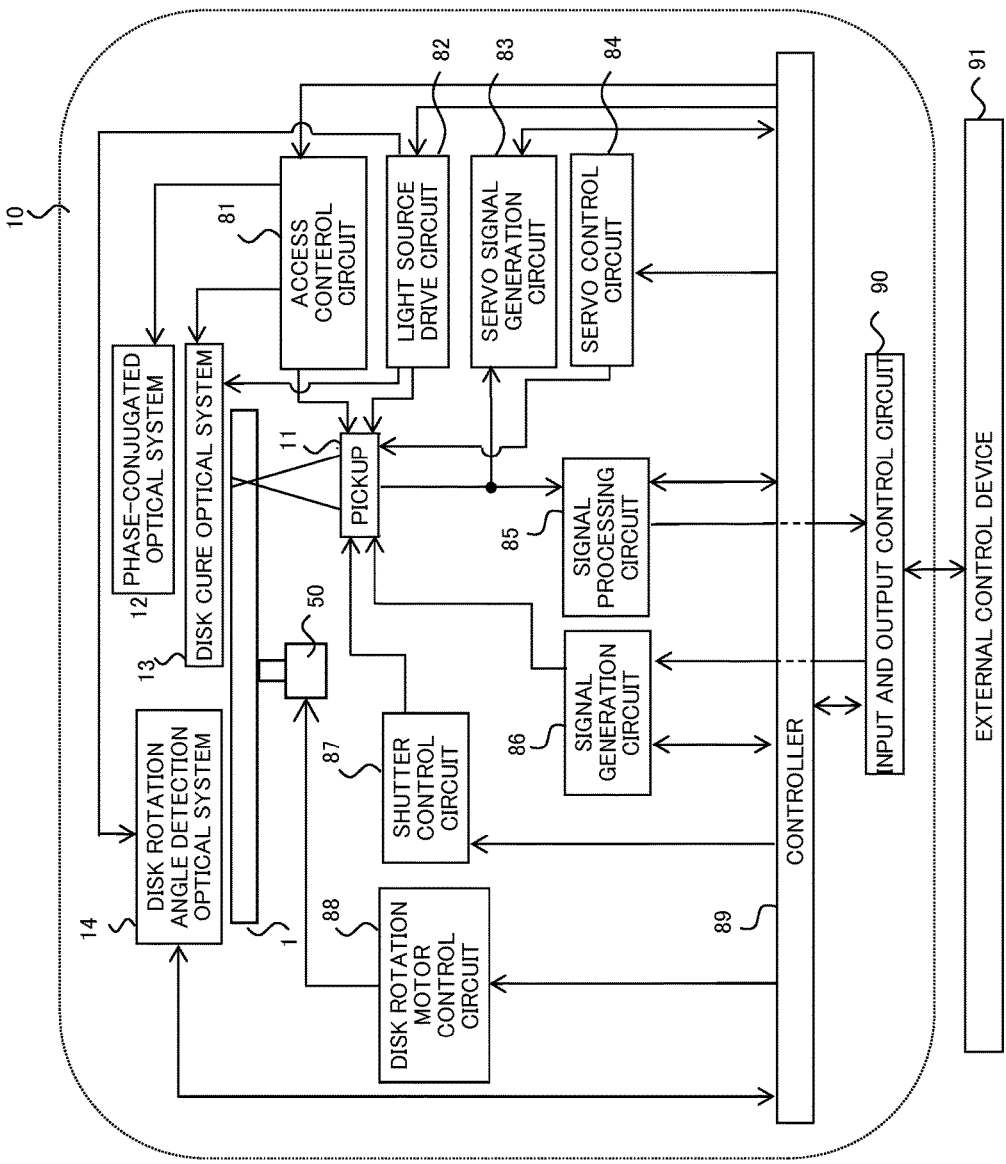
FIG. 6 is a schematic diagram of a block diagram illustrating a recording/reproducing apparatus.

FIG. 6 is a block diagram illustrating a recording/reproducing apparatus including an optical information recording medium which records and/or reproduces digital information by using holography.

An optical information recording/reproducing apparatus 10 is connected to an external control device 91 via an input and output control circuit 90. In the case of performing a recording operation, the optical information recording/reproducing apparatus 10 receives an information signal to be recorded from the external control device 91 via the input and output control circuit 90. In the case of performing a reproducing operation, apparatus 10 transmits the reproduced information signal to the external control device 91 via the input and output control circuit 90.

The optical information recording/reproducing apparatus 10 includes a pickup 11, a reproduction reference beam optical system 12, a disk cure optical system 13, a disk rotating angle detecting optical system 14, and a rotating motor 50. The optical information recording medium 1 is configured to be rotatable by the rotating motor 50.

Pickup 11 is composed of optical components described for example at FIG. 1 and plays a role in emitting a reference beam and a signal beam to the optical information recording medium 1 and recording digital information on a recording medium by using holography. On this occasion, an information signal to be recorded is supplied to a spatial light modulator of the pickup 11 via a signal generation circuit 86 by a controller 89, and the signal beam is modulated by the spatial light modulator.

When reproducing the information recorded in the optical information recording medium 1, a light beam which is made to be incident on the optical information recording medium in a direction opposite (or the same as) to that at the time of recording a reference beam emitted from the pickup 11 is generated by the reproduction reference beam optical system 12. Reproduction light reproduced by a reproduction reference beam is detected by a detector of the pickup 11, and a signal is reproduced by a signal processing circuit 85.

The opening and closing time in a shutter of the pickup 11 is controlled through a shutter control circuit 87 by the controller 89, and through the process, irradiation time of the reference beam and signal beam irradiated on the optical information recording medium 1 can be adjusted.

The disk cure optical system 13 plays a role in generating a light beam for use in a pre-cure process and a post-cure process of the optical information recording medium 1. When information is recorded on a desired position of the optical information recording medium 1, often a pre-cure process precedes the recording in which a predetermined light beam is previously irradiated before irradiating a reference beam and a signal beam on the desired position. The post-cure process is a subsequent process in which after information is recorded on a desired position of the optical information recording medium 1, a predetermined light beam is irradiated so as not to make a record on the desired position. Pre-cure is needed to minimize shrinkage of the material which degrades both of SNR and signal level of the reproduced signal. By post-cure, all the dynamic range of the material is consumed. As a result, recorded information is not alterable by additional exposure after all the recording process is completed.

The disk rotating angle detecting optical system 14 is used to detect a rotating angle (i.e., the incident angle for the writing of one page of data) of the optical information recording medium 1. When the optical information recording medium 1 is adjusted to a predetermined rotating angle, a signal according to the rotating angle is detected by the system 14. By using the detected signal, the rotating angle of the medium 1 can be controlled through a disk rotating motor control circuit 88 by the controller 89.

From a light source drive circuit 82, a predetermined light source drive current is supplied to light sources of the pickup 11, the disk cure optical system 13, and the disk rotating angle detecting optical system 14, thus permitting each light source to emit a light beam with predetermined light intensity.

Further, a servo mechanism for generating a signal for servo control in the signal generation circuit 83 and correcting the deviation amount through a servo control circuit 84 can be provided on the optical information recording/reproducing apparatus 10.

The processor 502, the memory 503 and the controller 504 for the adaptive optics 501 in FIG. 1 may be included in either block in FIG. 6.

Also, apparatus 10 has a translation mechanism capable of sliding a position of the optical pickup 11 or the medium 1 in the radial direction of the optical information recording medium 1, with position control undertaken by the access control circuit 81.

In pickup 11, the disk cure optical system 13, and the disk rotating angle detecting optical system 14, several optical system configurations or all the optical system configurations may be integrated into one configuration for simplicity.

Figure 7:
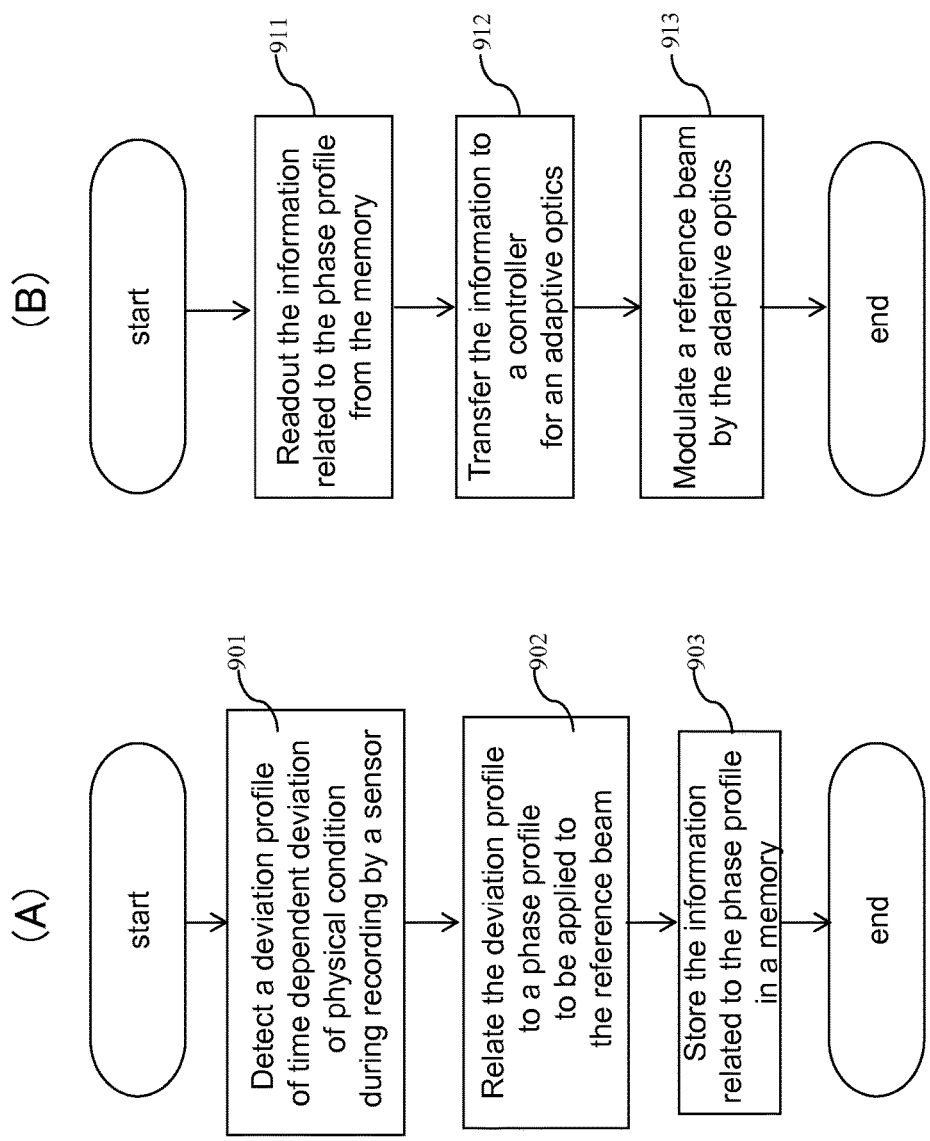
FIG. 7A is a schematic diagram of embodiments of a flow of operations during recording.
FIG. 7B is a schematic diagram of embodiments of a flow of operations (A) during reproduction.

FIG. 7 is schematic diagram depicting examples of two flowcharts of operations. FIG. 7A is a flowchart of the recording steps. FIG. 7B is a flowchart of the reproduction steps. When a recording operation starts, a sensor detects a deviation profile of time dependent deviation of physical condition such as angle and/or position of an optical component and/or an optical beam in the apparatus during recording. The time dependent deviation is a deviation from the nominal angle and/or position produced for example by mechanical vibrations on the optical components of the optical information recording/reproducing apparatus 10. Next, a processor relates the deviation profile to either a phase or amplitude profile to be applied to the reference beam. Then, the information related to either the phase or amplitude profile is stored in a memory. On the other hand, when reproduction operation starts, the information related to either the phase or amplitude profile is transferred from the memory to a controller for an adaptive optics. Then, the adaptive optics modulate at least either a phase or amplitude profile of a reference beam.

(Second Embodiment)

Figure 8:
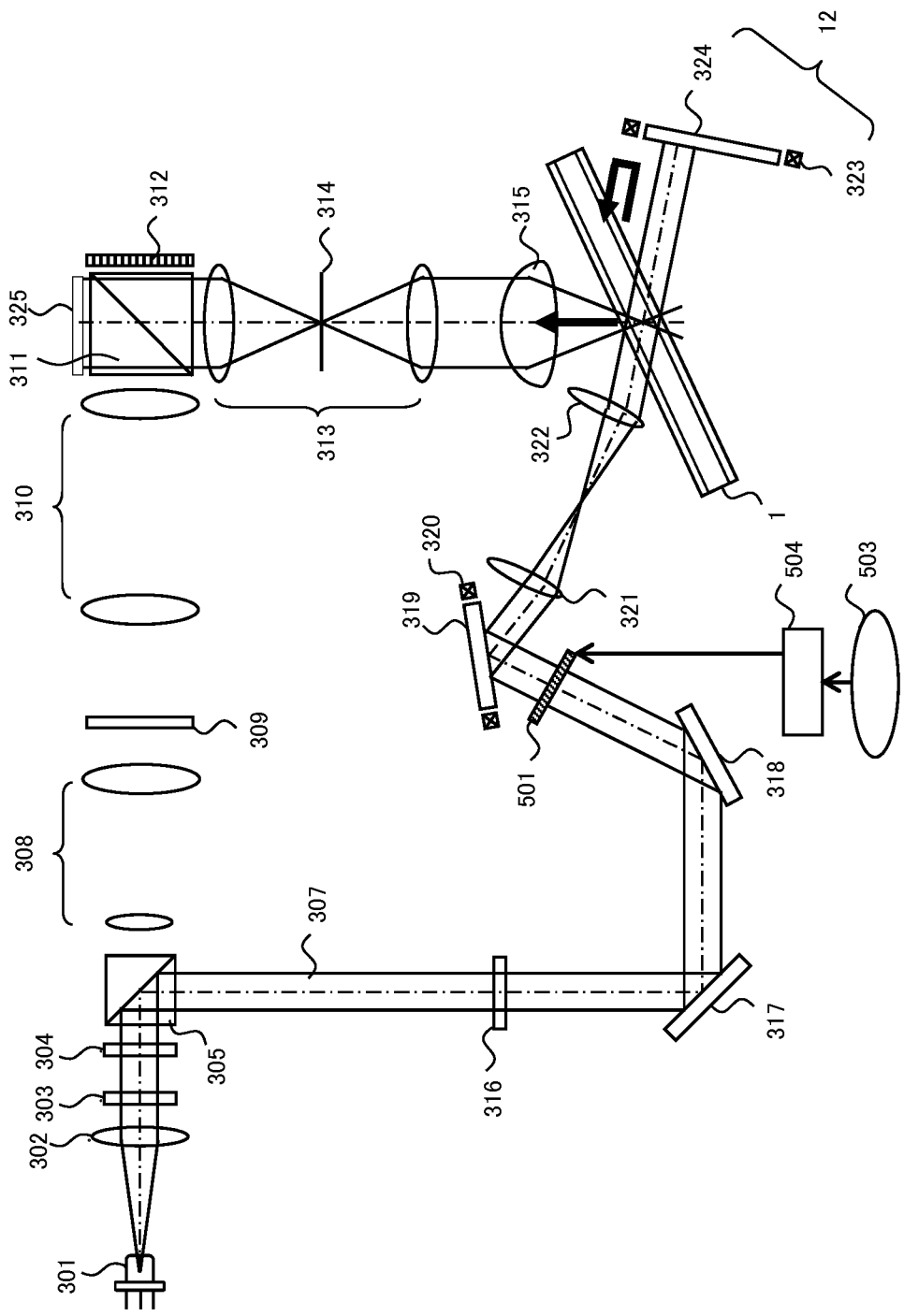
FIG. 8 is a schematic illustrating a reproduction principle of a second example of a basic optical system in the optical information recording/reproducing apparatus.
Figure 9:
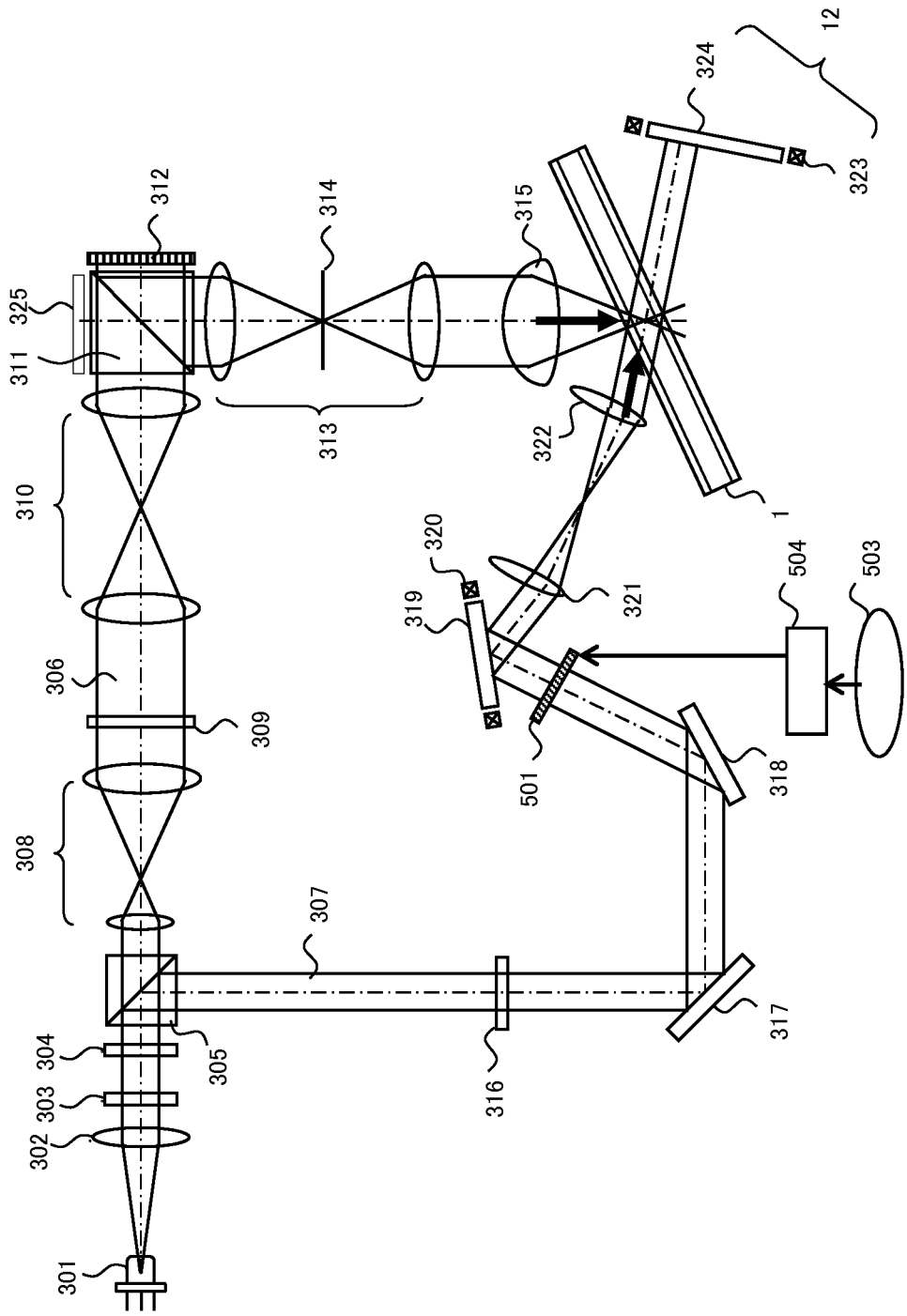
FIG. 9 is a schematic illustrating a recording principle of a second example of a basic optical system in the optical information recording/reproducing apparatus.

A second embodiment of the invention will be described with reference to FIG. 8. In this embodiment, the control signal for the adaptive optics 501 is produced according to a design specification of a servomechanism for components in the system. In other words, the control signal is predetermined according to a design specification of a servomechanism for such as the galvano mirror. Therefore, a sensor in order to detect physical condition of components or optical beam is not necessarily required. In this embodiment, the deviation profiler can be a control signal derived from a design specification of a servomechanism, utilized to control the adaptive optics 501 during reproduction of the hologram. The control signal may be applied to the adaptive optics 501 during recording as described in FIG. 9 instead of during reproducing because almost the same compensation effect can be achieved as described in Eq. (6) and Eq. (7). The adaptive optics 501 may have a prefixed phase plate.

Figure 11:
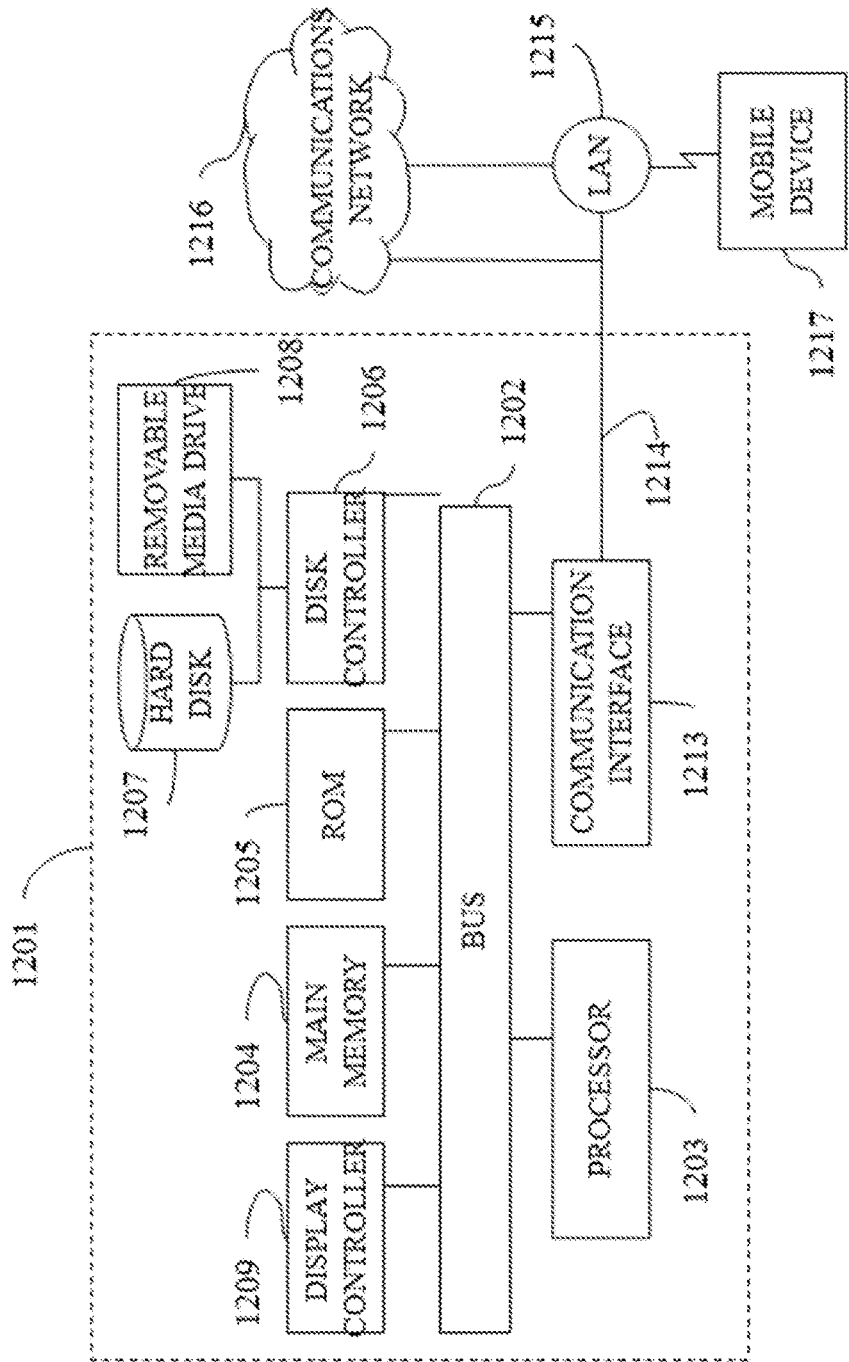
FIG. 11 is a schematic illustration of an exemplary computer system.

Computer-implementation:

FIG. 11 illustrates a computer system 1201 for implementing various embodiments of the invention. The computer system 1201 may be used to perform any or all of the functions described above. For example, one or more computer systems 1201 can be programmed to perform the embodiments described above with regard to the flow charts in FIGS. 7A and 7B and the embodiments noted above with respect to external control device 91, controller 89, signal generation circuit 86, signal processing circuit 85, and/or the other circuits and controls in FIG. 6. One or more computer systems 1201 can be programmed to perform the embodiments described above with regard to FIGS. 1 and 2 and the sensors and controls described therein.

The computer system 1201 can include a bus 1202 or other communication mechanism for communicating information, and a processor 1203 coupled with the bus 1202 for processing the information. The computer system 1201 can also include a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 can further include a read only memory (ROM) 1205 or other static storage device (e.g., programmable read only memory (PROM), erasable PROM (EPROM), and electrically erasable PROM (EEPROM)) coupled to the bus 1202 for storing static information and instructions for the processor 1203.

The computer system 1201 can also include a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display, such as a cathode ray tube (CRT), for displaying information to a computer user. The computer system includes input devices, such as a keyboard and a pointing device, for interacting with a computer user and providing information to the processor 1203. The pointing device, for example, may be a mouse, a trackball, or a pointing stick for communicating direction information and command selections to the processor 1203 and for controlling cursor movement on the display. In addition, a printer may provide printed listings of data stored and/or generated by the computer system 1201.

The computer system 1201 performs a portion or all of the processing steps of the invention (such as for example those described above in relation to processing the time dependent deviations and deriving an adaptive filter for compensation thereof) in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the invention includes software for controlling the computer system 1201, for driving a device or devices (such as sensors and controls) for implementing the invention. Such software may include, but is not limited to, device drivers, operating systems, development tools, and applications software. Such computer readable media further includes the computer program product of the invention for performing all or a portion (if processing is distributed) of the processing performed in implementing the invention.

The computer code devices of the invention may be any interpretable or executable code mechanism, including but not limited to scripts, interpretable programs, dynamic link libraries (DLLs), Java classes, and complete executable programs. These and other programming languages can be used to encode and solve or approximate the above-described model(s) (e.g., the equations enumerated above) used for compensation of noise on the hologram recording and/or reproducing devices of this invention. Moreover, parts of the processing of the invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

The computer system 1201 can also include a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. In one embodiment, this provides the invention the capability to have multiple of the above described reading and/or recording apparatuses networked together for purposes such as for example factory wide automation or quality control. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213.

Numerous modifications and variations of the present invention are possible in light of the above teachings. It is therefore to be understood that within the scope of the appended claims, the invention may be practiced otherwise than as specifically described herein.

The invention claimed is:

1. An optical information processing apparatus for recording information in a holographic medium, the apparatus comprising:
 a laser source which generates at least one optical beam including a reference beam and a signal beam;
 a beam control device which steers an incident angle of the reference beam with respect to the holographic medium to write data in the holographic medium based on interference of the reference beam and the signal beam in the holographic medium, the beam control device comprising a Galvano mirror;
 a deviation profiler which obtains a time dependent deviation profile of the optical beam for one page of data recorded in the holographic medium at a nominally fixed angle of the incident angle of the reference beam, wherein the deviation profiler comprises a sensor which detects a time dependent deviation profile of the optical beam in the apparatus during recording of one page of data at a nominally fixed angle for the incident angle of the reference beam, the sensor detecting the time dependent deviation profile of the Galvano mirror during the recording;
 a processor programmed to relate the time dependent deviation profile to at least one of a phase profile and an amplitude profile to be applied to the reference beam; and
 an adaptive optical element which applies said at least one of the phase profile and the amplitude profile to the reference beam to compensate for time dependent deviations of the optical beam.

2. The apparatus of claim 1, wherein the sensor detects a time dependent deviation of at least one of an angle and a position of an optical component in a path of the optical beam.

3. The apparatus of claim 1, wherein the processor is programmed to relate the time dependent deviation of said at least one of the angle and the position of an optical component to said at least one of the phase profile and the amplitude profile to be applied to the reference beam.

4. The apparatus of claim 1, wherein the sensor detects an angular deviation profile of the incident angle of the reference beam during the recording.

5. The apparatus of claim 4, wherein the processor is programmed to relate the angular deviation profile of the incident angle to said at least one of the phase profile and the amplitude profile to be applied to the reference beam.

6. The apparatus of claim 1, wherein the processor is programmed to relate the time dependent deviation profile of the galvano mirror to said at least one of the phase profile and the amplitude profile to be applied to the reference beam.

7. The apparatus of claim 1, wherein the sensor detects a positional deviation profile of the medium during recording, during the recording.

8. The apparatus of claim 7, wherein the processor is programmed to relate the positional deviation profile of the medium to said at least one of the phase profile and the amplitude profile to be applied to the reference beam.

9. The apparatus of claim 1 wherein the deviation profiler is programmed to estimate the time dependent deviation profile from a design specification of an optical component in a path of the at least one optical beam.

10. The apparatus of claim 9, wherein the deviation profiler is programmed to estimate the time dependent deviation profile from the design specification of a servo-mechanism of a galvanometer mirror in the path of the at least one optical beam.

11. The apparatus of claim 1, further comprising a memory storing said at least one of the phase profile and the amplitude profile to be applied to the reference beam.

12. The apparatus of claim 1, wherein the processor is programmed to relate the time dependent deviation profile to said at least one of the phase profile and the amplitude profile so that the adaptive optical element follows the function $f(x)$, $$f(x) = \frac{1}{\int_0^{t_r} \exp\left\{j\frac{2\pi}{\lambda}\cos\theta_0 \cdot \Delta\theta(t) \cdot x\right\} dt}$$

where $\theta_0$ is a designed incident angle of the reference beam with respect to the holographic medium, $t_r$ is the recording exposure time, $\Delta\theta(t)$ is a time dependent deviation of the incident angle of the reference beam from the designed incident angle $\theta_0$, $\lambda$ is a wavelength of the reference beam, and x indicates a deviated position of the reference beam on an axis including the incident angle $\theta_0$.

13. An optical information processing apparatus for reading information in a holographic medium, the apparatus comprising:
 a laser source which generates a reference beam;
 a beam control device which steers an incident angle of the reference beam with respect to the holographic medium to read data in the holographic medium;
 a processor programmed to relate a time dependent deviation profile, associated with an optical beam which recorded said data in the holographic medium, to at least one of a phase profile and an amplitude profile to be applied to the reference beam;

an adaptive optical element which applies said at least one of the phase profile and the amplitude profile to the reference beam to compensate for time dependent deviations of the optical beam which occurred in the recording of said information;

an optical reader which reads said data in the holographic medium; and wherein the processor is programmed to relate the time dependent deviation profile to said at least one of the phase profile and the amplitude profile so that the adaptive optical element follows the function $f(x)$, $$f(x) = \frac{1}{\int_0^{t_r} \exp\left\{j\frac{2\pi}{\lambda}\cos\theta_0 \cdot \Delta\theta(t) \cdot x\right\}dt}$$

where $\theta_0$ is a designed incident angle of the reference beam with respect to the holographic medium, $t_r$ is the recording exposure time, $\Delta\theta(t)$ is a time dependent deviation of the incident angle of the reference beam from the designed incident angle $\theta_0$, $\lambda$ is a wavelength of the reference beam, and x indicates a deviated position of the reference beam on an axis including the incident angle $\theta_0$.

14. An optical information processing apparatus for recording information in a holographic medium, the apparatus comprising:
    a laser source which generates at least one optical beam including a reference beam and a signal beam;
    a beam control device which steers an incident angle of the reference beam with respect to the holographic medium to write data in the holographic medium based on interference of the reference beam and the signal beam in the holographic medium;
    a deviation profiler which obtains a time dependent deviation profile of the optical beam for one page of data recorded in the holographic medium at a nominally fixed angle of the incident angle of the reference beam, wherein the deviation profiler is programmed to estimate the time dependent deviation profile from a design specification of an optical component in a path of the at least one optical beam, the deviation profiler being programmed to estimate the time dependent deviation profile from the design specification of a servomechanism of a galvanometer mirror in the path of the at least one optical beam;
    a processor programmed to relate the time dependent deviation profile to at least one of a phase profile and an amplitude profile to be applied to the reference beam; and
    an adaptive optical element which applies said at least one of the phase profile and the amplitude profile to the reference beam to compensate for time dependent deviations of the optical beam.

15. An optical information processing apparatus for recording information in a holographic medium, the apparatus comprising:
    a laser source which generates at least one optical beam including a reference beam and a signal beam;
    a beam control device which steers an incident angle of the reference beam with respect to the holographic medium to write data in the holographic medium based on interference of the reference beam and the signal beam in the holographic medium;
    a deviation profiler which obtains a time dependent deviation profile of the optical beam for one page of data recorded in the holographic medium at a nominally fixed angle of the incident angle of the reference beam;
    a processor programmed to relate the time dependent deviation profile to at least one of a phase profile and an amplitude profile to be applied to the reference beam; and
    an adaptive optical element which applies said at least one of the phase profile and the amplitude profile to the reference beam to compensate for time dependent deviations of the optical beam; and
    wherein the processor is programmed to relate the time dependent deviation profile to said at least one of the phase profile and the amplitude profile so that the adaptive optical element follows the function $f(x)$, $$f(x) = \frac{1}{\int_0^{t_r} \exp\left\{j\frac{2\pi}{\lambda}\cos\theta_0 \cdot \Delta\theta(t) \cdot x\right\}dt}$$

where $\theta_0$ is a designed incident angle of the reference beam with respect to the holographic medium, $t_r$ is the recording exposure time, $\Delta\theta(t)$ is a time dependent deviation of the incident angle of the reference beam from the designed incident angle $\theta_0$, $\lambda$ is a wavelength of the reference beam, and x indicates a deviated position of the reference beam on an axis including the incident angle $\theta_0$.

* * * * *